(12) United States Patent
Fujii

(10) Patent No.: US 7,502,132 B2
(45) Date of Patent: Mar. 10, 2009

(54) FACSIMILE APPARATUS

(75) Inventor: Takanori Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 10/829,619

(22) Filed: Apr. 19, 2004

(65) Prior Publication Data

US 2004/0212839 A1 Oct. 28, 2004

(30) Foreign Application Priority Data

Apr. 22, 2003 (JP) ............................. 2003-116423

(51) Int. Cl.
*G06F 3/12* (2006.01)
*G06F 15/16* (2006.01)
*H04N 1/00* (2006.01)
*H04L 12/66* (2006.01)
*H04M 7/00* (2006.01)

(52) U.S. Cl. ...................... 358/1.15; 358/402; 709/206; 370/352; 379/220.01

(58) Field of Classification Search ................ 358/1.9, 358/1.14, 440, 468, 442, 400, 402, 529, 1.15, 358/1.13, 422, 1.4; 370/252, 352, 401, 341, 370/420; 379/100.01, 88.01, 88.17, 220.01; 348/558; 709/206; 341/50; 382/232; 713/153
See application file for complete search history.

(56) References Cited

U.S. PATENT DOCUMENTS

| | | | | |
|---|---|---|---|---|
| 5,365,517 A * | 11/1994 | Kato et al. | .................. | 370/420 |
| 5,764,864 A * | 6/1998 | Sujita | ......................... | 358/1.14 |
| 5,774,654 A * | 6/1998 | Maki | ........................... | 358/1.9 |
| 5,862,202 A * | 1/1999 | Bashoura et al. | ............ | 358/440 |
| 6,035,205 A * | 3/2000 | Han | ...................... | 379/100.01 |
| 6,049,597 A * | 4/2000 | Satake et al. | ................ | 358/440 |
| 6,097,506 A * | 8/2000 | Eda et al. | ..................... | 358/468 |
| 6,128,104 A * | 10/2000 | Okabe et al. | ................ | 358/442 |
| 6,377,309 B1 * | 4/2002 | Ito et al. | ..................... | 348/558 |

(Continued)

FOREIGN PATENT DOCUMENTS

JP     2000-183949    6/2000

(Continued)

OTHER PUBLICATIONS

U.S. Appl. No. 09/610,812 of Takanori Fujii et al., filed Jul. 6, 2000.

*Primary Examiner*—Twyler L Haskins
*Assistant Examiner*—Jonathan R Beckley
(74) *Attorney, Agent, or Firm*—Cooper & Dunham, LLP

(57) ABSTRACT

A facsimile apparatus is disclosed that performs accurate and efficient facsimile transmission while obtaining accurate reception capacity information of each transmission destination. The reception capacity of each transmission destination is stored, together with the mail address, in a memory unit of the apparatus. When facsimile transmission accompanied by a delivery confirmation request is carried out, a main controlling unit causes the memory unit to store the transmission mode. If delivery confirmation mail from the transmission destination contains reception capacity information, the main controlling unit causes the memory unit to store it as the reception capacity information of the transmission destination. If the delivery confirmation mail does not contain reception capacity information but confirms that the communication has been properly completed, the transmission mode already stored in the memory unit is stored as a transmission enabling mode of the transmission destination in the memory unit.

11 Claims, 3 Drawing Sheets

U.S. PATENT DOCUMENTS

| | | | |
|---|---|---|---|
| 6,381,038 B1 * | 4/2002 | Endo | 358/400 |
| 6,385,179 B1 * | 5/2002 | Malcolm et al. | 370/341 |
| 6,426,809 B1 * | 7/2002 | Hayashi et al. | 358/529 |
| 6,522,429 B2 * | 2/2003 | Endo | 358/400 |
| 6,628,760 B2 * | 9/2003 | Mirashrafi et al. | 379/88.01 |
| 6,756,921 B2 * | 6/2004 | Kimura et al. | 341/50 |
| 6,822,764 B1 * | 11/2004 | Okabe et al. | 358/442 |
| 6,882,629 B2 * | 4/2005 | Odaira | 370/252 |
| 6,883,016 B1 * | 4/2005 | Fujii et al. | 358/422 |
| 6,947,182 B1 * | 9/2005 | Kumagai | 358/402 |
| 6,956,663 B1 * | 10/2005 | Iida | 358/1.15 |
| 6,961,137 B1 * | 11/2005 | Tamura | 358/1.15 |
| 6,982,811 B2 * | 1/2006 | Sato | 358/1.4 |
| 6,985,478 B2 * | 1/2006 | Pogossiants et al. | 370/352 |
| 7,002,972 B1 * | 2/2006 | Endo | 370/401 |
| 7,027,176 B2 * | 4/2006 | Tanimoto | 358/1.15 |
| 7,068,846 B1 * | 6/2006 | Yaguchi | 382/232 |
| 7,092,379 B1 * | 8/2006 | Singh et al. | 370/352 |
| 7,142,320 B2 * | 11/2006 | Tanimoto | 358/1.15 |
| 7,180,637 B2 * | 2/2007 | Tanimoto | 358/1.15 |
| 7,213,145 B2 * | 5/2007 | Sasmazel | 713/153 |
| 7,230,733 B2 * | 6/2007 | Adegawa | 358/1.15 |
| 2002/0080415 A1 * | 6/2002 | Akimoto et al. | 358/402 |
| 2003/0016395 A1 * | 1/2003 | Kajiwara | 358/402 |
| 2004/0001224 A1 * | 1/2004 | Kajiwara | 358/1.15 |
| 2004/0024829 A1 * | 2/2004 | Tanimoto | 709/206 |
| 2004/0051896 A1 * | 3/2004 | Saitoh et al. | 358/1.13 |
| 2004/0051899 A1 * | 3/2004 | Saitoh et al. | 358/1.15 |
| 2004/0051900 A1 * | 3/2004 | Sagiya et al. | 358/1.15 |
| 2004/0057421 A1 * | 3/2004 | Kawabata et al. | 370/352 |
| 2004/0057568 A1 * | 3/2004 | Kawabata et al. | 379/88.17 |
| 2004/0184110 A1 * | 9/2004 | Maei et al. | 358/400 |

FOREIGN PATENT DOCUMENTS

| | | |
|---|---|---|
| JP | 2000-332940 | 11/2000 |
| JP | 2001-203847 | 7/2001 |
| JP | 2001-265675 | 9/2001 |
| JP | 2002-199198 | 7/2002 |
| JP | 2002-218152 | 8/2002 |
| JP | 2002-252736 | 9/2002 |

* cited by examiner

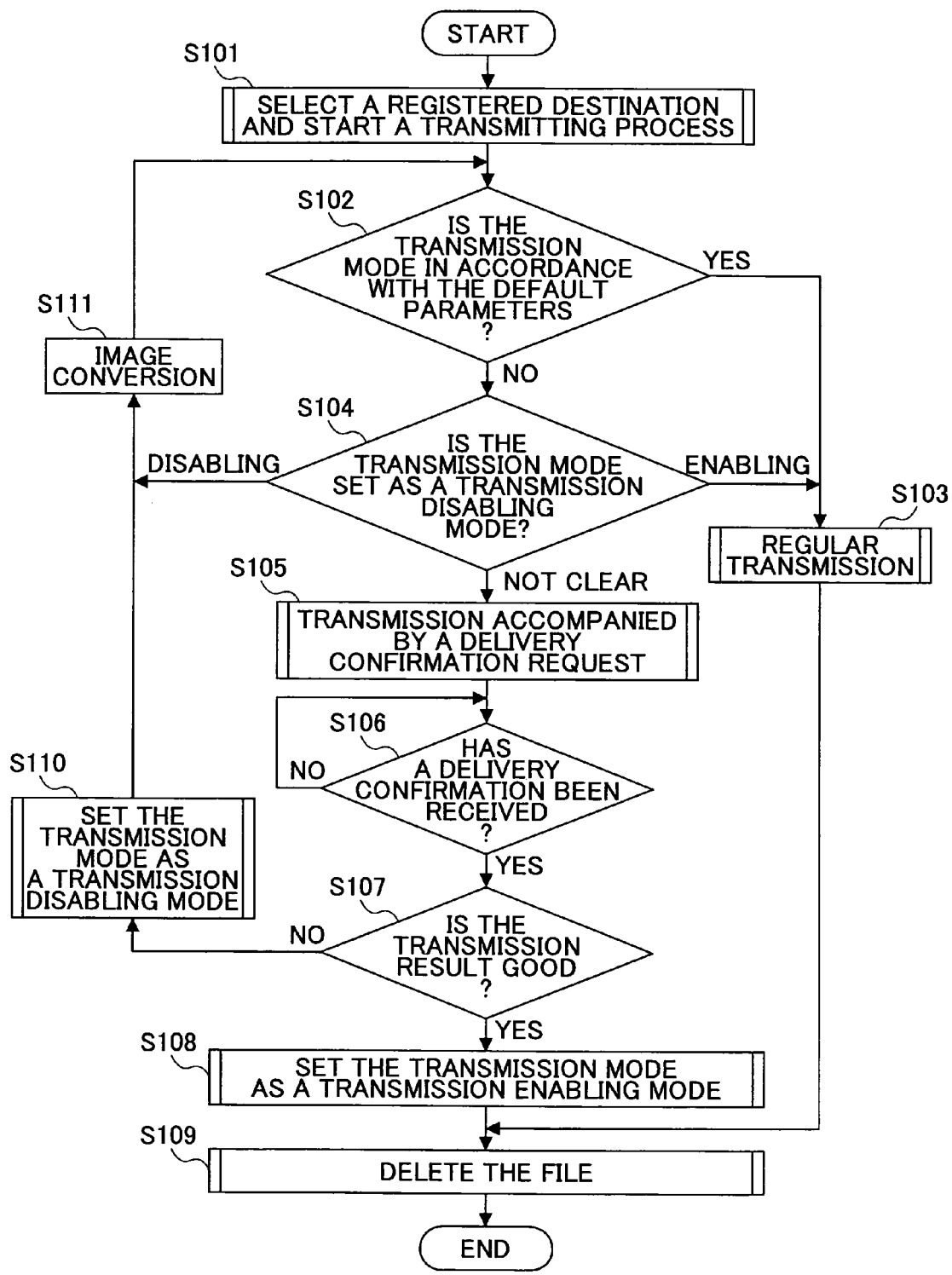

FACSIMILE APPARATUS

BACKGROUND

1. Technical Field

This disclosure relates to a facsimile apparatus, and more particularly, to a facsimile apparatus that easily obtains accurate reception capacity information of each transmission destination, and performs accurate and efficient facsimile transmission of e-mail image files through a network.

2. Description of the Related Art

Conventionally, a facsimile apparatus has been used in a stand-alone state in which the apparatus operates independently, and conventional facsimile communication procedures (transmission procedures) have been set in accordance with the ITU (International Telecommunication Union)-T recommendation T.30.

In the general G3/G4 facsimile communication procedures, function exchange among G3 DIS/DCS signals or G4 CSS/RSSP signals is carried out at the time of transmission, so that the function having the highest possible communication speed that can be accepted on the receiving end can be used for transmission. The function is stored in the apparatus, and is reused for the next transmitting operations to the same receiving end.

As the performance of each apparatus has advanced and the communication networks have developed in recent years, facsimile apparatuses having functions of transmitting and receiving image information to and from other apparatuses via a network such as the Internet have been produced (see Japanese Laid-Open Patent Application Nos. 2000-332940, 2001-265675, 2002-199198, 2000-183949, 2001-203847, and 2002-218152).

Such facsimile apparatuses that perform communications via a network utilize the ITU-T recommendation T.37 simple-mode, as disclosed in Japanese Laid-Open Patent Application No. 2002-252736.

In any of the above facsimile apparatuses, however, the ITU-T recommendation T.37 simple-mode utilizing a network (the Internet) is employed. With any of those conventional facsimile apparatuses, image data (image file) transmission can be carried out via the Internet, but the function of the transmission destination cannot be ascertained before the facsimile communication via the Internet. This is the problem with those conventional network facsimile apparatuses.

The ITU-T recommendation T.37 simple-mode employed by the conventional facsimile apparatuses utilizing the Internet does not include a capacity negotiating procedure, and therefore, transmission and reception are generally carried out with the default parameters (A4/200 dpi or 200×100 dpi/MH).

More specifically, the facsimile apparatus on the transmitting end cannot determine the functions of a transmission destination apparatus. Even if the apparatus on the receiving end has a function that is compatible with a compression method such as MMR (Modified MR) or JBIG (Joint Binary Image Group), each transmitting operation includes a process of compressing an image file by the MH (modified Huffman) method, which is the default compressing mode. This causes inconvenience in facsimile communications. As transmission is always carried out in the default compressing mode, the amount of transmission data increases, and the load on the network also increases. This also causes longer communications times with Internet providers, resulting in higher communications costs.

On the other hand, the ITU-T recommendation T.37 full-mode can provide a function of sending delivery confirmation mail to notify a facsimile apparatus on the transmitting end of the reception capacity on the receiving end. In this case, the facsimile apparatus on the transmitting end needs to have a function of storing the reception capacity information of each facsimile apparatus serving as a transmission destination. Storing of the reception capacity information can be carried out through an operation by a user.

However, if the facsimile apparatus on the receiving end does not show (provide) the reception capacity information in the delivery confirmation mail, the ITU-T recommendation T.37 full-mode function of the facsimile apparatus on the transmitting end cannot be fully utilized. In such a case, transmission is carried out only with the default parameters, unless a user expands the settings.

SUMMARY

In an aspect of this disclosure, a facsimile apparatus is provided that performs facsimile transmission to another facsimile apparatus not having a reception capacity notifying function without a user taking the trouble to carry out a registering process, utilizing an advanced function equivalent to the ITU-T recommendation T.37 full-mode function. Such a facsimile apparatus fully utilizes the capacity provided therein, and increases the usability.

In another aspect of this disclosure, a facsimile apparatus is provided that is connected to a network and has an ITU-T recommendation T.37 full-mode function for facsimile transmission of an image file processed by an image processor using parameters corresponding to a transmission mode, at least with a delivery confirmation request being attached to the image file, the facsimile transmission being carried out via the network. In an exemplary embodiment of such facsimile apparatus, a destination information memory stores reception capacity information of a selected transmission destination or reception capacity information of the selected transmission destination contained in delivery confirmation mail sent form the selected transmission destination, the reception capacity information being associated with the mail address of the selected transmission destination. A controller causes a transmission mode memory to store the transmission mode used for the facsimile transmission accompanied by the delivery confirmation request. If the delivery confirmation mail from the selected transmission destination contains reception capacity information, the controller causes the destination information memory to store the reception capacity information as the reception capacity information of the selected transmission destination. If the delivery confirmation mail does not contain the reception capacity information but confirms that the communication has been properly completed, the controller causes the destination information memory to store the transmission mode, already stored in the transmission mode memory, as a transmission enabling mode of the selected transmission destination. Achieving the usability equivalent to the ITU-T recommendation T.37 full-mode, this facsimile apparatus can readily and accurately obtain the reception capacity information of each transmission destination that does not have the function of providing the reception capacity information through the delivery confirmation mail. Thus, accurate and efficient facsimile transmission of image files can be carried out via a network.

In yet another aspect of this disclosure, a facsimile apparatus having a controller is provided that causes the destination information memory to store transmission mode information, which has already been stored in the transmission mode memory, indicating the transmission mode as a transmission disabling mode of the selected transmission destination, when the delivery confirmation mail sent from the selected transmission destination does not contain the reception capacity information but confirms that the communication failed. With this structure, facsimile transmission in an unusable communication mode can be avoided, and more accurate and efficient facsimile transmission of image files can be carried out via a network.

In another aspect of this disclosure, a facsimile apparatus having a controller is provided that causes an image memory to keep an image file for transmission until the delivery confirmation mail is sent from the selected transmission destination, when the image file that has been processed by the image processor using parameters different from default parameters is facsimile-transmitted at least together with a delivery confirmation request. When delivery confirmation mail is received from the selected transmission destination reporting that the communication failed, the image processor converts the image file kept in the image memory into an image file corresponding to the default parameters, and the converted image file is facsimile-transmitted again to the selected transmission destination. In this manner, image files that have once failed to be transmitted can be resent in suitable states. Thus, more accurate and more efficient facsimile transmission of image files can be carried out via a network.

In yet another aspect of this disclosure, a facsimile apparatus is provided that is connected to a network and has an ITU-T recommendation T.37 full-mode function for facsimile transmission of an image file processed by an image processor using parameters corresponding to a transmission mode, at least with a delivery confirmation request being attached to the image file, the facsimile transmission being carried out via the network. An exemplary embodiment of such facsimile apparatus includes: a destination information memory that stores reception capacity information of a selected transmission destination or reception capacity information of the selected transmission destination contained in delivery confirmation mail sent from the selected transmission destination, the reception capacity information being associated with the mail address of the selected transmission destination; a transmission mode memory that stores a transmission mode used for facsimile transmission accompanied at least by the delivery confirmation request; and a controller that causes the transmission mode memory to store the transmission mode used for the facsimile transmission with the delivery confirmation request, causes the destination information memory to store reception capacity information contained in the delivery confirmation mail sent from the selected transmission destination, the reception capacity information being stored as the reception capacity information of the selected transmission destination, and causes the destination information memory to store the transmission mode, already stored in the transmission mode memory, as a transmission enabling mode of the selected transmission destination when the delivery confirmation mail does not contain the reception capacity information but confirms that the communication has been properly completed.

With the above structure, a facsimile apparatus that is connected to a network and has an ITU-T recommendation T.37 full-mode function for facsimile-transmitting an image file processed by an image processor using parameters corresponding to a transmission mode is obtained. In the facsimile transmission, at least a delivery confirmation request is attached to the image file, and the facsimile transmission is carried out via the network. Also in the facsimile apparatus, a destination information memory stores reception capacity information of a selected transmission destination or reception capacity information of the selected transmission destination contained in delivery confirmation mail sent from the selected transmission destination, the reception capacity information being associated with the mail address of the selected transmission destination. A controller causes a transmission mode memory to store the transmission mode used for the facsimile transmission accompanied by the delivery confirmation request. If the delivery confirmation mail from the transmission destination contains reception capacity information, the controller causes the destination information memory to store the reception capacity information as the reception capacity information of the transmission destination. If the delivery confirmation mail does not contain the reception capacity information but confirms that the communication has been properly completed, the controller causes the destination information memory to store the transmission mode, already stored in the transmission mode memory, as a transmission enabling mode of the selected transmission destination. Achieving usability equivalent to the ITU-T recommendation T.37 full-mode, this facsimile apparatus can readily and accurately obtain the reception capacity information of each transmission destination that does not have the function of providing the reception capacity information through the delivery confirmation mail. Thus, accurate and efficient facsimile transmission of image files can be carried out via a network.

In the above facsimile apparatus, the controller may cause the destination information memory to store the transmission mode, which has already been stored in the transmission mode memory, as a transmission disabling mode of the selected transmission destination, when the delivery confirmation mail sent from the selected transmission destination does not contain the reception capacity information but confirms that the communication failed.

With the above structure, when the delivery confirmation mail sent from the selected transmission destination does not contain the reception capacity information but confirms that the communication failed, the controller causes the destination information memory to store the transmission mode, which has already been stored in the transmission mode memory, as a transmission disabling mode of the selected transmission destination. With this structure, facsimile transmission in an unusable communication mode can be avoided, and more accurate and efficient facsimile transmission of image files can be carried out via a network.

The above facsimile apparatus may further include an image memory that stores image files for transmission. In this facsimile apparatus, when an image file that has been processed by the image processor using parameters different from default parameters is facsimile-transmitted at least together with the delivery confirmation request, the controller keeps the image file in the image memory until the delivery confirmation mail is sent from the selected transmission destination. When delivery confirmation mail is sent from the selected transmission destination reporting that the communication failed, the image processor converts the image file kept in the image memory into an image file corresponding to the default parameters, and the converted image file is facsimile-transmitted again to the selected transmission destination.

With the above structure, the controller causes the image memory to keep an image file for transmission until the delivery confirmation mail is sent from the selected transmission destination, when the image file that has been processed by the image processor using parameters different from default parameters is facsimile-transmitted at least together with a delivery confirmation request. When delivery confirmation mail is received from the selected transmission destination reporting that the communication failed, the image processor converts the image file kept in the image memory into an image file corresponding to the default parameters, and the converted image file is facsimile-transmitted again to the selected transmission destination. In this manner, image files that have once failed to be transmitted can be resent in suitable states. Thus, more accurate and more efficient facsimile transmission of image files can be carried out via a network.

The above and other aspects, features, and advantages of the present invention will become more apparent from the following detailed description taken in conjunction with the accompanying drawings.

BRIEF DESCRIPTION OF THE DRAWINGS

FIG. 3 is a flowchart showing a communication controlling operation involving a destination information managing process to be performed by the facsimile apparatus shown in FIG. 1.

DESCRIPTION OF THE PREFERRED EMBODIMENTS

The following is a description of embodiments of the present invention, with reference to the accompanying drawings.

Figure 1:
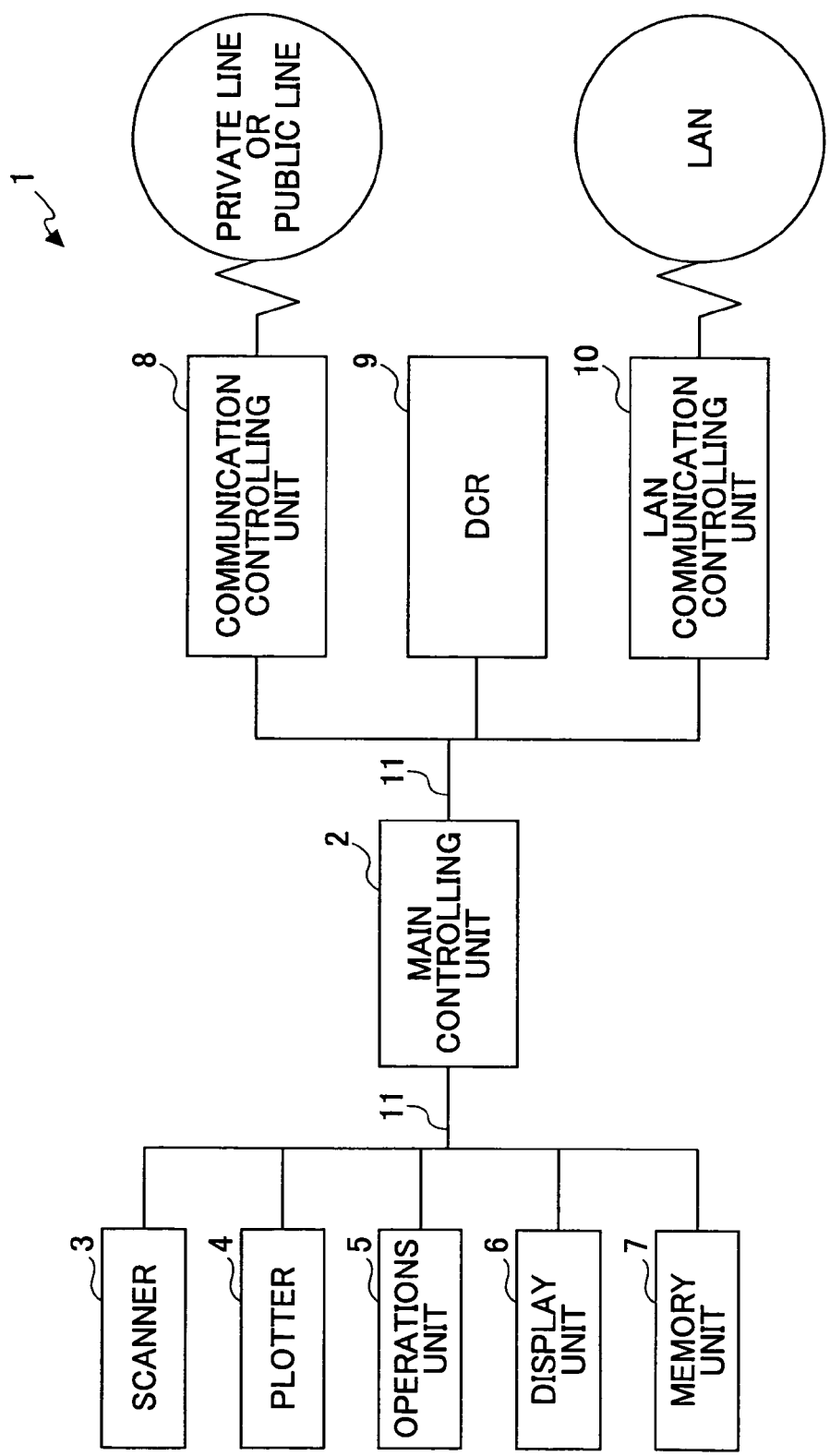
FIG. 1 is a block diagram illustrating the structure of a facsimile apparatus in accordance with one embodiment of the present invention.
Figure 2:
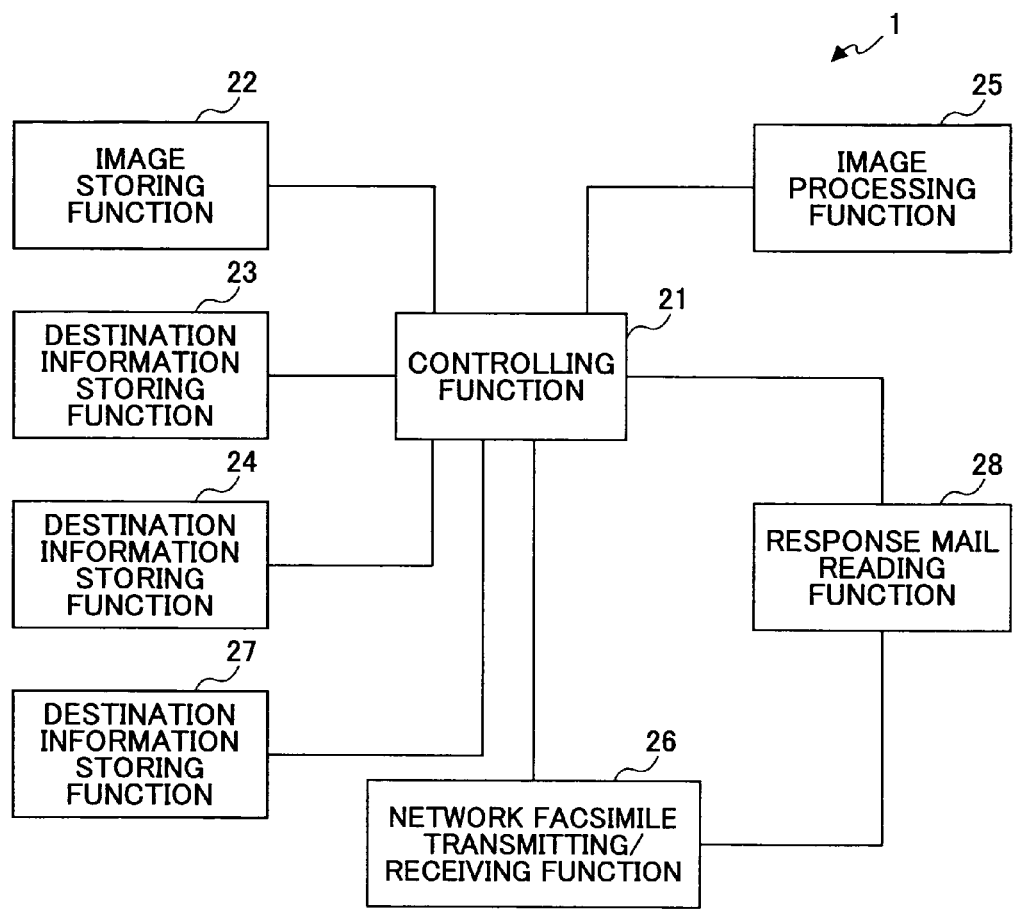
FIG. 2 is a block diagram illustrating the functions of the facsimile apparatus shown in FIG. 1.

FIGS. 1 through 3 illustrate one embodiment of a facsimile apparatus in accordance with the present invention. FIG. 1 is a block diagram illustrating the structure of a facsimile apparatus 1 in accordance with the present invention.

In FIG. 1, the facsimile apparatus 1 includes a main controlling unit 2, a scanner 3, a plotter 4, an operations unit 5, a display unit 6, a memory unit 7, a communication controlling unit 8, a DCR (coding/decoding) 9, and a LAN communication controlling unit 10. These components are connected to each another by a bus 11.

The scanner 3 may be a line image sensor equipped with a CCD (Charge Coupled Device), for example, and includes an ADF. Documents are set on the ADF, which feeds the documents, one by one, to the document reading position of the scanner 3. The scanner 3 scans each document transported from the ADF, and reads in the image of each document with a predetermined resolution.

The plotter 4 may be a thermal recording device, an electrophotographic recording device, or an inkjet recording device, for example. The plotter 4 records received images and the image of each document read by the scanner 3 on recording sheets. The plotter 4 also records various reports on recording sheets.

The operations unit 5 includes operation keys such as a numeric keypad and a start key, function keys, and menu keys. The operations unit 5 further includes a display such as a liquid crystal display, for example. Through the operation keys of the operations unit 5, telephone numbers and mail addresses of transmission destinations are transmitted, various information items such as the reception capacities of transmission destinations are input, and various commands and instructions are also input. The contents of instructions and operations input through the operation keys and the menu keys, and various information items sent from the facsimile apparatus 1 to operators are displayed on the display.

The memory unit 7 (a destination information memory, a transmission mode memory, and an image memory) may be a RAM (Random Access Memory) or a hard disk. The memory unit 7 stores image data such as transmission image information and reception image information, dial information such as the telephone numbers of recorded transmission destinations, the telephone numbers and the names of transmission destinations associated with one-touch dialing and abbreviated dialing, own information such as the telephone number and the name of the apparatus, read density information, and record density information. The memory unit 7 also stores the telephone numbers of transmission destinations for facsimile communications through a network (the Internet) in association with the mail addresses of the transmission destinations. The memory unit 7 further stores the transmission destinations associated with destination information of the transmission destination, such as reception capacity information, transmission modes, transmission enabling modes, and transmission disabling modes. The destination information can be added to, altered, or deleted from, through a key operation using the operations unit 5.

The communication controlling unit 8 is connected to a public line or a private line such as the PSTN (Public Switched Telephone Network) or the ISDN (Integrated Services Digital Network). The communication controlling unit 8 performs automatic call and answer operations, and modulation and demodulation through a built-in data modem.

The DCR 9 (an image processor) encodes image data by various encoding methods, such as the MR (Modified Relative element address designate) encoding method, the MMR (Modified MR) encoding method, the standard MH method, and the JBIG method. The DCR 9 also decodes the encoded image data.

The LAN communication controlling unit 10 may be connected to a network such as a LAN (Local Area Network) that is connected to a public line. Alternatively, the LAN communication controlling unit 10 may be connected directly to a public line such as the PSTN or ISDN. The LAN communication controlling unit 10 controls protocols such as TCP/IP, PPP (Point to Point Protocol), and SMTP (Simple Mail Transfer Protocol)/POP (Post Office Protocol), thereby receiving electronic mail transmitted through the LAN or a public line, and sending electronic mail to transmission destinations.

More specifically, the LAN communication controlling unit 10 has a T.37 full-mode communication function. Accordingly, the LAN communication controlling unit 10 is capable of performing transmission together with a delivery confirmation request, and receives delivery confirmation mail from the transmission destination in response to the delivery confirmation request. The facsimile apparatus on the receiving end can add reception result information and the reception capacity information (reception function information) of the receiving end to the delivery confirmation mail. With the reception result information, the facsimile apparatus on the receiving end notifies the transmitting end whether facsimile reception has been properly completed. The reception result information serves as transmission result information on the transmitting end.

The main controlling unit 2 (a controller) includes a ROM (Read Only Memory), a RAM, and a CPU (Central Processing Unit). The ROM stores various programs such as a basic operation program of the facsimile apparatus 1 and a destination information managing program (described later), and various data such as system data that are essential for executing each program. In accordance with the programs stored in the ROM, the CPU of the main controlling unit 2 utilizes the RAM as a work memory to control each component of the facsimile apparatus 1. In this manner, the main controlling unit 2 performs basic operations of the facsimile apparatus 1, and also performs a destination information managing operation that is described below.

The facsimile apparatus 1 has functions as shown in FIG. 2. More specifically, the facsimile apparatus 1 includes a controlling function 21, an image storing function 22, a destination information storing function 23, a transmission mode storing function 24, an image processing function 25, a network facsimile transmitting/receiving function 26, a transmission mode determining function 27, and a response mail reading function 28. Using the ITU-T recommendation T.37 full-mode, the facsimile apparatus 1 transmits image data in a suitable transmission mode for the capacity of the transmission destination.

The controlling function 21, the transmission mode determining function 27, and the response mail reading function 28 are embodied by the main controlling unit 2. The image storing function 22, the destination information storing function 23, and the transmission mode storing function 24 are embodied by the memory unit 7. The image processing function 25 is embodied by the DCR 9. The network facsimile transmitting/receiving function 26 is embodied by the LAN communication controlling unit 10.

More specifically, the image storing function 22 stores transmission image data as image files, under the control of the controlling function 21. The destination information storing function 23 stores the reception capacity information of transmission destinations associated with the mail addresses of the transmission destinations. The reception capacity information of each transmission destination is set through the operations unit 5 or received through the delivery confirmation mail from each transmission destination. The destination information storing function 23 also stores the transmission enabling mode of each transmission destination.

The image processing function 25 performs image processing on the image data in the transmission files under the control of the controlling function 21, using parameters in accordance with the transmission mode.

The network facsimile transmitting/receiving function 26 transmits and receives through a network the image files, which have been processed by the image processing function 25 with the parameters according to the transmission mode, under the control of the controlling function 21. The network facsimile transmitting/receiving function 26 also has the ITU-T recommendation T.37 full-mode function that carries out facsimile transmission and reception through a network, with delivery confirmation requests to the transmission destinations being added to the transmission.

The transmission mode determining function 27 determines the transmission mode for facsimile transmission under the control of the controlling function 21. The response mail reading function 28 decodes the delivery confirmation mail received by the network facsimile transmitting/receiving function 26, and notifies the controlling function 21 of the contents of the delivery confirmation mail.

The transmission mode storing function 24 stores the transmission mode, under the control of the controlling function 21, at the time of facsimile transmission accompanied by a delivery confirmation request.

The controlling function 21 stores the transmission mode in the mode storing function 24 at the time of facsimile transmission accompanied by a delivery confirmation request. After the reception capacity information is sent from the transmission destination through the delivery confirmation mail, and the response mail reading function 28 decodes the reception capacity information, the reception capacity information is stored as the reception capacity information of the transmission destination in the destination information storing function 23. Even if the reception capacity is not included in the delivery confirmation mail, the response mail reading function 29 reads from the delivery confirmation mail whether the communication went well. If the communication result is good, the response mail reading function 28 sets the transmission mode that has already been stored in the transmission mode storing function 24 as the transmission enabling mode of the transmission destination in the destination information storing function 23. In a case where the reception capacity information is not contained in the delivery confirmation mail from the transmission destination, and the response mail reading function 28 reads from the delivery confirmation mail that the communication failed, the controlling function 21 sets the transmission mode that has already been stored in the transmission mode storing function 24 as the transmission disabling mode of the transmission destination in the destination information storing function 23. Further, each time facsimile transmission accompanied by a delivery confirmation request is carried out, the controlling function 21 stores the image file of the facsimile transmission in the image storing function 22. In a case where an image file that has been processed by the image processing function 25 with parameters different from the default parameters is transmitted in the facsimile transmission, the controlling function 21 keeps the image file in the image storing function 22 until delivery confirmation mail is received from the transmission destination. When delivery confirmation mail indicating that the communication result is not good is received from the transmission destination, the image processing function 25 converts the image data stored in the image storing function 22 into an image corresponding to the default parameters. The network facsimile transmitting/receiving function 26 then facsimile-transmits the converted image again to the transmission destination.

Referring now to FIG. 3, the operation of this embodiment is next described. The facsimile apparatus 1 is characterized by transmitting image data in a suitable mode for the reading mode of the original document and the reception capacity of the transmission destination, utilizing the ITU-T recommendation T.37 full-mode.

In the facsimile apparatus 1, one of the transmission destinations having its mail addresses stored in the destination information storing function 23 of the memory unit 7 is first selected through a one-touch button or the like on the operations unit 5, and transmission to the selected transmission destination is carried out by the operations unit 5 (step S101). The transmission mode determining function 27 of the main controlling unit 2 then determines the document reading mode used by the scanner 3, which is the transmission mode. The determined transmission mode is stored in the transmission mode storing function 24 of the memory unit 7. The main controlling unit 2 then determines whether the reading mode (transmission mode) is the reading mode (transmission mode) corresponding to the default parameters (step S102). If the reading mode is determined to be the transmission mode corresponding to the default parameters, the image file of the image data read from the document with the scanner 3 is stored in the image storing function 22 of the memory unit 7, and the image file is then transmitted through a regular facsimile transmitting process (step S103). After the facsimile transmission is completed, the image file is deleted from the memory unit 7 (step S109), and the operation comes to an end.

If the transmission mode is determined not to be the transmission mode corresponding to the default parameters in step S102, the main controlling unit 2 determines whether the transmission mode is set as a transmission disabling mode of the selected transmission destination stored in the destination information storing function 23 (step S104). If the transmission mode is a transmission enabling (allowing) mode, the regular transmission is carried out, and the image file is deleted from the memory unit 7 (step S109). The operation then comes to an end.

If the transmission mode is set as neither a transmission disabling mode nor a transmission enabling mode of the selected transmission destination stored in the destination information storing function 23 of the memory unit 7 in step S104, the main controlling unit 2 stores the image file read from the document with the scanner 3 in the image storing function 22 of the memory unit 7, and adds a delivery confirmation request to the image file. The LAN communication controlling unit 10 then facsimile-transmits the image file accompanied by the delivery confirmation request to the selected transmission destination (step S105).

After the facsimile transmission accompanied by the delivery confirmation request is completed, the main controlling unit 2 waits for the LAN communication controlling unit 10 to receive delivery confirmation mail from the selected transmission destination (step S106). The main controlling unit 2 then determines whether the transmission result is good based on the read result from the response mail reading function 28 (step S107).

If the transmission result is determined to be good in step S107, the main controlling unit 2 sets the transmission mode, which has already been stored in the transmission mode storing function 24 of the memory unit 7, as the transmission enabling mode for the destination information of the selected transmission destination stored in the destination information storing function 23 of the memory unit 7 (step S108). The image file is then deleted from the memory unit 7 (step S109), and the operation comes to an end.

If the transmission result is not good in step S107, the main controlling unit 2 sets the transmission mode, which has already been stored in the transmission mode storing function 24 of the memory unit 7, as the transmission disabling mode for the destination information of the selected transmission destination stored in the destination information storing function 23 of the memory unit 7 (step S110). The DCR 9 then converts the image file, which has been stored in the image storing function 22 of the memory unit 7 and is to be transmitted to the selected transmission destination, into an image to be transmitted in the transmission mode corresponding to the optimum parameters for the selected transmission destination, such as the transmission mode corresponding to the default parameters (step S111).

After the image converting process is completed, the main controlling unit 2 returns to step S102, and repeats the above procedures. When facsimile transmission is completed properly, the image file that has been transmitted is deleted from the image storing function 22 of the memory unit 7 (step S109). Then the operation then comes to an end.

As described so far, the facsimile apparatus 1 of this embodiment is connected to a network, and has the ITU-T recommendation T.37 full-mode function. The DCR 8 performs image processing on each image file to be transmitted, using parameters corresponding to the transmission mode. A delivery confirmation request is added to each processed image file, the image file accompanied by the delivery confirmation request is facsimile-transmitted from the LAN communication controlling unit 10 to a transmission destination through the network. While doing so, the facsimile apparatus 1 associates the mail address of the transmission destination with the reception capacity information of the transmission destination set by the operation unit 5 or the reception capacity information of the transmission destination provided through delivery confirmation mail sent from the transmission destination in reply to a delivery confirmation request, and then stores the reception capacity information associated with the mail address in the destination information storing function 23 of the memory unit 7. At the time of facsimile transmission accompanied by a delivery confirmation request, the main controlling unit 2 stores the transmission mode in the transmission mode storing function 24 of the memory unit 7. If reception capacity information of the transmission destination has been sent through delivery confirmation mail from the transmission destination, the main controlling unit 2 stores the reception capacity information as the reception capacity information of the transmission destination in the destination information storing function 23 of the memory unit 7. If reception capacity has not been sent through the delivery confirmation mail, the main controlling unit 2 stores the transmission mode, which has already been stored in the transmission mode storing function 24 of the memory unit 7, as a transmission enabling mode of the transmission destination in the destination information storing function 23 of the memory unit 7, after the delivery confirmation mail confirms that the communication result is good.

Even in a case where the receiving end does not have a function of notifying the reception capacity information through the delivery confirmation mail, it is possible to achieve usability equivalent to the ITU-T recommendation T.37 full-mode, and to obtain the reception capacity information of the transmission destination with ease and accuracy. Thus, accurate and efficient facsimile transmission of image files can be carried out through a network.

Further, in a case where reception capacity information has not been provided through delivery confirmation mail from the transmission destination after facsimile transmission accompanied by a delivery confirmation request, and where the delivery confirmation mail confirms that the communication failed, the transmission mode that has been stored in the transmission mode storing function 24 of the memory unit 7 is stored as a transmission disabling mode of the transmission destination in the destination information storing function 23 of the memory unit 7.

In this manner, inadvertent facsimile transmission in an unusable communication mode can be prevented, and more accurate and efficient facsimile transmission of image files can be carried out through a network.

Further, when an image file that has been processed by the DCR 9 using parameters different from the default parameters is facsimile-transmitted together with a delivery confirmation request, the main controlling unit 2 keeps the image file in the image storing function 22 of the memory unit 7 until delivery confirmation mail from the transmission destination is received. After receiving delivery confirmation mail from the transmission destination confirming that the communication failed, the image file stored in the image storing function 22 of the memory unit 7 is converted into an image file corresponding to the default parameters by the DCR 9. The converted image file is then facsimile-transmitted again to the transmission destination.

In this manner, image files that have once failed to be transmitted can be resent in preferred conditions. Thus, more accurate and efficient facsimile transmission of image files can be carried out through a network.

It should be noted that the present invention is not limited to the embodiments specifically disclosed above, but other variations and modifications may be made without departing from the scope of the present invention.

This patent application is based on Japanese Priority Patent Application No. 2003-116423, filed on Apr. 22, 2003, the entire contents of which are hereby incorporated by reference.

What is claimed is:

1. A facsimile apparatus that is connected to a network and has an ITU-T recommendation T.37 full-mode function for facsimile transmission of an image file processed by an image processor using parameters corresponding to a transmission mode, at least with a delivery confirmation request being attached to the image file, the facsimile transmission being carried out via the network, the facsimile apparatus comprising:
   a destination information memory that stores reception capacity information of a selected transmission destination, the reception capacity information being associated with the mail address of the selected transmission destination;
   a transmission mode memory that stores transmission mode information indicating a transmission mode used for a facsimile transmission accompanied by a delivery confirmation request to the selected transmission destination; and
   a controller configured to cause to be stored in the destination information memory reception capacity information contained in a delivery confirmation mail or other mail received from the selected transmission destination in response to the delivery confirmation request, as the reception capacity information of the selected transmission destination if the delivery confirmation mail or other mail received from the selected transmission destination includes the reception capacity information, and if the delivery confirmation mail or other mail received from the selected transmission destination does not include the reception capacity information but confirms that the facsimile transmission to the selected transmission destination has been properly completed, cause to be stored in the destination information memory the transmission mode information, already stored in the transmission mode memory, indicating the transmission mode used for the facsimile transmission to the selected transmission destination as a transmission enabling mode of the selected transmission destination.

2. The facsimile apparatus as claimed in claim 1, wherein the controller causes the destination information memory to store the transmission mode information, which has already been stored in the transmission mode memory, indicating the transmission mode as a transmission disabling mode of the selected transmission destination, when the delivery confirmation mail sent from the selected transmission destination does not contain the reception capacity information but confirms that the communication failed.

3. The facsimile apparatus as claimed in claim 1, further comprising:
   an image memory that stores image files for transmission; wherein
   when an image file that has been processed by the image processor using parameters different from default parameters is facsimile-transmitted at least together with the delivery confirmation request, the controller keeps the image file in the image memory until the delivery confirmation mail is received from the selected transmission destination, and
   when the delivery confirmation mail is received from the selected transmission destination reporting that the communication failed, the image processor converts the image file kept in the image memory into an image file corresponding to the default parameters, and the converted image file is facsimile-transmitted again to the selected transmission destination.

4. A facsimile apparatus that is connected to a network and has an ITU-T recommendation T.37 full-mode function for facsimile-transmitting an image file processed by an image processor using parameters corresponding to a transmission mode, at least with a delivery confirmation request being attached to the image file, the facsimile transmission being carried out via the network, the facsimile apparatus comprising:
   destination information storing means for storing reception capacity information of a selected transmission destination, the reception capacity information being associated with the mail address of the selected transmission destination;
   transmission mode storing means for storing transmission mode information indicating a transmission mode used for a facsimile transmission accompanied by a delivery confirmation request to the selected transmission destination; and
   controlling means for causing to be stored in the destination information storing means reception capacity information contained in a delivery confirmation mail received from the selected transmission destination in response to the delivery confirmation request, as the reception capacity information of the selected transmission destination if the delivery confirmation mail or other mail received from the selected transmission destination includes the reception capacity information, and if the delivery confirmation mail or other mail received from the selected transmission destination does not include the reception capacity information but confirms that the facsimile transmission to the selected transmission destination has been properly completed, causing to be stored in the destination information storing means the transmission mode information, already stored in the transmission mode storing means, indicating the transmission mode used for the facsimile transmission to the selected transmission destination as a transmission enabling mode of the selected transmission destination.

5. The facsimile apparatus as claimed in claim 4, wherein the controlling means causes the destination information storing means to store the transmission mode information, which has already been stored in the transmission mode storing means, indicating the transmission mode as a transmission disabling mode of the selected transmission destination, when the delivery confirmation mail received from the selected transmission destination does not contain the reception capacity information but confirms that the communication failed.

6. The facsimile apparatus as claimed in claim 4, further comprising:
   image storing means for storing image files for transmission; wherein
   when an image file that has been processed by the image processor using parameters different from default parameters is facsimile-transmitted at least together with the delivery confirmation request, the controlling means keeps the image file in the image storing means until the delivery confirmation mail is sent from the selected transmission destination, and
   when the delivery confirmation mail is received from the selected transmission destination reporting that the communication failed, the image processor converts the image file kept in the image storing means into an image file corresponding to the default parameters, and the converted image file is facsimile-transmitted again to the selected transmission destination.

7. A method of facsimile transmission using a facsimile apparatus that is connected to a network and has an ITU-T recommendation T.37 full-mode function for facsimile transmission of an image file processed by an image processor using parameters corresponding to a transmission mode, at least with a delivery confirmation request being attached to the image file, the facsimile transmission being carried out via the network, the method comprising the steps of:

storing, in a destination information memory, reception capacity information of a selected transmission destination, the reception capacity information being associated with the mail address of the selected transmission destination;

storing, in a transmission mode memory, transmission mode information indicating a transmission mode used for a facsimile transmission accompanied by a delivery confirmation request;

determining whether a delivery confirmation mail or other mail received from the selected transmission destination in response to the delivery confirmation request includes reception capacity information;

if the delivery confirmation mail or other mail received from the selected transmission destination includes the reception capacity information, controlling the destination information memory to store the reception capacity information that is contained in the delivery confirmation mail or other mail received from the selected transmission destination, as the reception capacity information of the selected transmission destination; and if the delivery confirmation mail or other mail received from the selected transmission destination does not include the reception capacity information but confirms that the facsimile transmission to the selected transmission destination has been properly completed, controlling the destination information memory to store the transmission mode information, already stored in the transmission mode memory, indicating the transmission mode used for the facsimile transmission to the selected transmission destination as a transmission enabling mode of the selected transmission destination.

8. The method of facsimile transmission of claim 7, further comprising:

storing, in the destination information memory, the transmission mode information indicating the transmission mode used for the facsimile transmission accompanied by the delivery confirmation request, as a transmission disabling mode of the selected transmission destination, when the delivery confirmation mail from the selected transmission destination does not contain the reception capacity information and confirms that the communication has failed.

9. The method of facsimile transmission of claim 7, further comprising:

storing in an image memory an image file processed using parameters different from default parameters, until said delivery confirmation mail is received from said selected transmission destination;

converting said image file kept in said image memory into a converted image file corresponding to said default parameters, if said delivery confirmation mail received from the selected transmission destination indicates that the communication failed; and transmitting the converted image file to the selected transmission destination.

10. The facsimile apparatus of claim 1, further comprising an image memory that stores image files for transmission, wherein the controller determines said transmission mode for said facsimile transmission and when the transmission mode corresponds to the transmission enabling mode, regular transmission is carried out and the transmitted image file is deleted from the image memory.

11. The facsimile apparatus of claim 1, wherein if the transmission mode information stored in the destination information memory for the selected transmission destination is neither does not indicate that the transmission mode is a transmission disabling mode or the transmission enabling mode, said controller, prior to transmission, stores the image file in an image memory and attaches a delivery confirmation request to said image file for transmission.

* * * * *